Figure 1:
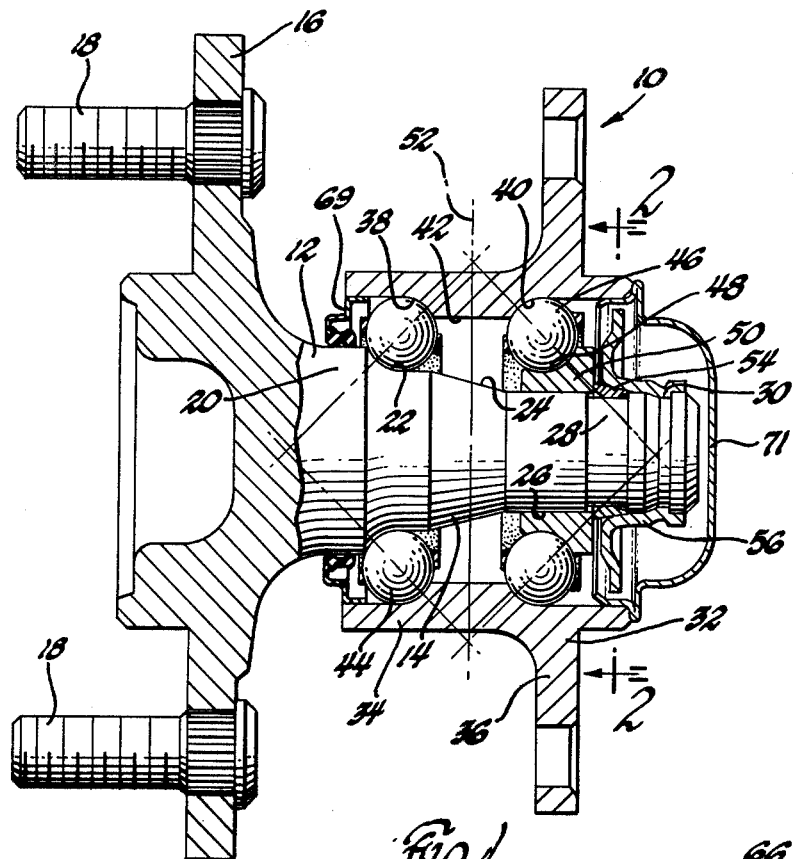

United States Patent [19]

Lura et al.

[11] 4,179,167
[45] Dec. 18, 1979

[54] ANTIFRICTION BEARING WITH MULTIPLE PIECE RACE

[75] Inventors: Loren E. Lura, Sandusky; Philip B. Zeigler, Port Clinton, both of Ohio

[73] Assignee: General Motors Corporation, Detroit, Mich.

[21] Appl. No.: 862,948

[22] Filed: Dec. 21, 1977

Related U.S. Application Data

[63] Continuation of Ser. No. 789,829, Apr. 22, 1977, abandoned.

[51] Int. Cl.$^2$ .............................................. F16C 33/30
[52] U.S. Cl. ................................. 308/189 A; 308/191; 308/194; 308/236; 308/DIG. 11
[58] Field of Search ................. 308/188, 189, 190–192, 308/193–198, 202, 17, 207, 208–214, 216, 174, 232–234, 235, 236, DIG. 11

[56] References Cited

U.S. PATENT DOCUMENTS

| | | | |
|---|---|---|---|
| 1,916,233 | 7/1933 | Riblet | 308/DIG. 11 |
| 3,157,442 | 11/1964 | Gaubatz | 308/191 |
| 3,901,568 | 8/1975 | Gadd et al. | 308/211 |

*Primary Examiner*—Douglas C. Butler
*Attorney, Agent, or Firm*—F. J. Fodale

[57] ABSTRACT

A rear wheel bearing assembly has a double row of balls and a two piece inner race. One race piece is positioned on the other race piece to give a desired preload or end play and maintained in such position by a pair of semicircular hardened and ground keeper ring parts of selected width. The keeper ring parts engage the one race piece and are retained in a groove of the second race piece by a retainer ring secured to the second race piece by a swaging or rolling operation.

4 Claims, 3 Drawing Figures

ANTIFRICTION BEARING WITH MULTIPLE PIECE RACE

This is a continuation of application Ser. No. 789,829, filed on Apr. 22, 1977 and now abandoned.

This invention relates generally to an antifriction bearing assembly and more particularly to an antifriction bearing assembly having a desired end play or preload.

It is already known from the U.S. Pat. No. 3,794,393 granted to Charles B. Hurd et al on Feb. 26, 1974 for a "Roller Bearing Assembly" to provide a double row roller bearing assembly having a two piece outer race in which the end play or preload is controlled by a split snap ring of selected width to maintain a separable outer bearing race at a desired location in the bore of the second race piece.

While the Hurd et al Roller Bearing Assembly may be suitable for some applications, it has some drawbacks in that the split snap ring used to locate the race 62 makes automated assembly of the bearing assembly difficult in general and even more so since split snap rings vary in width and thus in spring rate from bearing assembly to bearing assembly. Another drawback is that the split ring retention device utilized in the Hurd et al Bearing Assembly does not lend itself to bearing assemblies in which the end play or preload is adjusted by an inner race of two piece construction.

Broadly it is the object of this invention to provide an antifriction bearing assembly having an improved means for providing a desired end play or preload.

Another object of this invention is to provide an antifriction bearing assembly utilizing means to provide a desired end play or preload which lends itself to automated assembly.

Another object of this invention is to provide an antifriction bearing assembly having a preadjusted end play or preload comprising a two piece race wherein one race piece is accurately positioned on another race piece by a keeper means which engages the first race piece for a full 360°.

Still another object of this invention is to provide an antifriction bearing assembly having a preadjusted end play or preload in which the means positioning the one race part with respect to another race part includes hardened and ground members engaging the one race part for increased durability and positioning accuracy.

Yet another object of this invention is to provide an antifriction bearing assembly having means for providing a preadjusted end play or preload which is suitable for an antifriction bearing assembly which utilizes an inner race of two piece construction to achieve a desired end play or preload.

Figure 2:
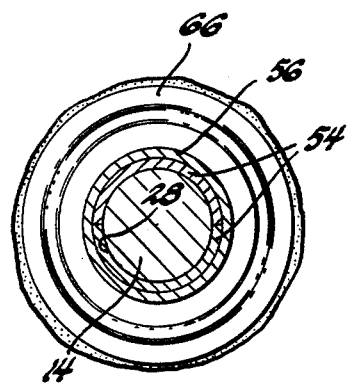
Figure 3:
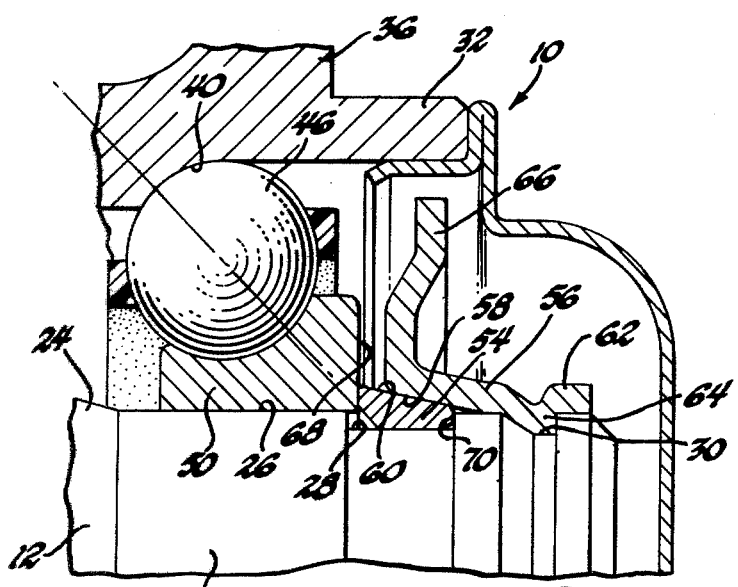

Other objects and features of the invention will become apparent to those skilled in the art as the disclosure is made in the following detailed description of a preferred embodiment of the invention as illustrated in the accompanying sheet of drawing in which:

FIG. 1 is a longitudinal section through a wheel bearing assembly embodying this invention, FIG. 2 is a section taken along the line 2—2 of FIG. 1, and FIG. 3 is an enlargement of a portion of FIG. 1.

Referring now to FIG. 1 and by way of background there is illustrated a rear wheel bearing assembly 10 used for instance in an independently suspended rear wheel of a front wheel drive automobile. To this end the rear wheel bearing assembly 10 incorporates a dead or non-rotatable spindle 12 comprising an axle 14 and integral circular mounting flange 16. The mounting flange 16 carries a plurality of bolts 18 for securing the assembly 10 to suitably structure in the automobile.

The axle 14 as it progresses from the flange 16 toward the free end of the axle 14 includes a cylindrical seal land 20, an angular contact raceway 22, a conical section 24, and a cylindrical portion 26 of reduced diameter. The cylindrical portion 26 has a square shaped inboard groove 28 and a trapezoidal shaped outboard groove 30 adjacent the free end of the axle 14.

The bearing assembly 10 further includes a hub 32 comprising an outer race 34 and integral wheel mounting flange 36. The wheel mounting flange 36 is rectangularly shaped to provide access to the bolt holes in the circular mounting flange 16. (The section of the wheel mounting flange 36 shown in FIG. 1 is along the diagonal of the rectangle through the bolt holes located at the corners of the rectangle.)

The outer race 34 has a pair of axially spaced angular contact raceways 38 and 40 separated by a common shoulder defining a reduced diameter bore 42 in the medial portion of the bearing.

A first complement of bearing balls 44 circumferentially spaced by a separator rides on the inner and outer raceways 22 and 38. A second complement of bearing balls 46 rides on the outer raceway 40 and the angular contact raceway 48 of a separable inner race 50 which is fitted on the cylindrical portion 26 of the axle 14.

The inner race 50 is positioned on the cylindrical portion 26 to produce a desired end play or preload in the bearing assembly by selected width keeper ring parts 54 disposed in the groove 28 end to end as shown in FIG. 2. When the bearing is preloaded the bearing balls 44 and 46 have pressure angles such that opposing thrust loads acting toward the medial plane 52 of the bearing are imposed on the outer race 34 via the raceways 38 and 40. Each of the keeper ring parts 54 are shaped so that the keeper ring parts 54 are mountable in the groove 28 without requiring elastic deformation and together engage the outboard face of the inner race 50 for a full 360°. The keeper ring parts 54 are hardened to a Rockwell Hardness between 55 and 60 on the C scale for durability, ground for extreme dimensional accuracy in width and segregated in 0.0002 inch width classes for producing a desired end play or preload. The groove 28 preferably undercuts the raceway by a small amount.

The keeper ring parts 54 are bottomed and maintained in the square shaped groove 28 by a sheet metal retainer ring 56 which has a conical inner surface 58 engaging a mating frustoconical outer surface 60 of each of the keeper ring parts 54. The retainer ring 56 has a cylindrical end portion 62 which is swaged or rolled at 64 into the trapezoidal shaped groove 30 to securely fasten the retainer ring 56 to the axle 14.

The retainer ring 56 may also include a flange 66 having an outer diameter greater than the diameter of the bore 42 to prevent disassembly of the bearing in the event of catastrophic failure of the internal bearing components.

The assembly 10 may also include bearing seal 69 carried at the end of the hub 32 adjacent the circular mounting flange 16 which has a flexible sealing lip riding on the cylindrical land 20 of the axle 14. A grease cap 71 mounted in the bore at the other end of the hub 34 seals the other end of the bearing assembly 10.

The axial end play or preload of the bearing assembly 10 is obtained by the axial positioning of the separable inner race 50 on the axle 14. To maintain the axial end play or preload the inner race 50 is pressed on the cylindrical portion 26 of the axle 14 to the proper location to give the desired end play or preload and positively retained in position.

When assembling the bearing 10 the complements of bearing balls 44 and 46 and hub 34 are sub-assembled with the spindle 12. The separable inner race 50 is then pressed on the cylindrical portion 26 of the axle 14 to a convenient location and the axial end play and distance from the inner race back face 68 and the radial face 70 of the square shaped groove 28 away from the inner race are measured. Using the measured values and the desired final end play of the assembly the required width of keeper ring parts 54 to be inserted in the groove 28 is determined. The separable inner race 50 may then be repositioned axially to its final desired location and keeper ring parts 54 of proper selected width inserted in the groove 28, or the keeper ring parts may be forced into the groove 28 between the separable bearing race back face 68 and the groove end face 70 to obtain the final positioning for the desired end play or preload. Once the keeper ring parts 54 are bottomed in the groove 28, the retaining ring 56 is placed on the axle spindle with its tapered inner surface 58 in contact with the tapered outer surfaces 60 of the keeper ring parts 54. The cylindrical portion 62 of the retaining ring is then swaged or rolled into the trapezoidal shaped groove 30 to permanently lock the retaining ring 56 in place and contain the keeper ring parts 54 in the groove 28.

Any thrust force applied to the bearing assembly tending to move the separable inner race 50 toward the right as viewed in FIGS. 1 and 3 and thus changing the preset end play or preload is transmitted from the inner race 30 through the end face 68 to the keeper ring parts 54 and then into the axle 14 through the groove end face 70. The keeper ring parts 54 and spindle 12 are of a suitable hardness to resist permanent deformation thus preventing movement of the separable inner race 50 and change of the preset end play or preload.

We wish it to be understood that we do not desire to be limited to the exact details of constuction shown and described, for obvious modifications will occur to a person skilled in the art.

What is claimed is:

1. An antifriction bearing assembly comprising:
   a first race having first raceway means,
   circumferentially spaced antifriction element means engaging said first raceway means,
   a second race comprising a first piece and a second piece, said first piece carrying a fixed angular contact raceway engaging said antifriction means for providing a thrust load acting on said first raceway means,
   said second piece being carried by said first piece and having an angular contact raceway engaging said antifriction means for providing an opposing thrust load acting on said first raceway means,
   said first piece having a circumferential groove receiving a plurality of hardened keeper ring parts which engage an end face of the second piece, said keeper ring parts being of a selected width to produce a desired end play or preload, and
   an annular retainer ring having a portion which engages said keeper ring parts to retain said keeper ring parts in said groove and another portion which is permanently secured to said second piece.

2. An antifriction bearing assembly comprising:
   a first race having first raceway means,
   circumferentially spaced antifriction element means engaging said first raceway means,
   a second race comprising a first piece and a second piece, said first piece carrying a fixed angular contact raceway engaging said antifriction means for providing a thrust load acting on said first raceway means,
   said second piece being carried by said first piece and having an angular contact raceway engaging said antifriction means for providing an opposing thrust load acting on said first raceway means,
   said first piece having a circumferential groove receiving a plurality of hardened keeper ring parts end to end which forms a hardened keeper ring engaging an end face of the second piece, said keeper ring parts being of a selected width to produce a desired end play or preload, and
   an annular retainer ring having a frustoconical surface engaging frustoconical outer surfaces of said keeper ring parts to retain said keeper ring parts in said groove and a cylindrical portion which is permanently secured to said second piece.

3. A double row antifriction bearing comprising:
   a one piece outer race carrying a pair of angular contact outer raceways in fixed spatial relationship, each of said outer raceways having a reduced diameter at their adjacent ends whereby said outer raceways are adapted to receive opposing thrust loads directed toward a medial plane of the bearing between the outer raceways,
   first and second complements of circumferentially spaced antifriction elements respectively engaging said pair of outer raceways,
   an axle disposed in said outer race, said axle carrying a fixed inner raceway engaging said first complement of antifriction elements for providing a thrust load acting on one of said pair of outer raceways toward said medial plane,
   said axle further carrying a separable inner race having an inner raceway engaging said second complement of antifriction elements for providing an opposing thrust load acting on the other of said pair of outer raceways,
   said axle having a circumferential groove adjacent an end face of said separable inner race remote from said medial plane,
   a plurality of hardened keeper ring parts disposed in said groove end to end forming a hardened keeper ring engaging said end face of the separable inner race, said keeper ring parts having outer frustoconical surfaces, and being of a selected width to produce a desired end play or preload, and
   an annular retainer ring having a frustoconical surface engaging the frustoconical surfaces of said keeper ring parts to retain said keeper ring parts in said groove and a cylindrical portion which is deformed and permanently locked to the axle.

4. A double row antifriction bearing comprising:
   a one piece outer race carrying a pair of angular contact outer raceways in fixed spatial relationship, each of said outer raceways having a reduced diameter at their adjacent ends whereby said outer raceways are adapted to receive opposing thrust loads directed toward a medial plane of the bearing between the outer raceways, first and second complements of circumferentially spaced antifriction elements respectively engaging said pair of outer raceways, an axle disposed in said outer race, said axle carrying a fixed inner raceway engaging said first complement of antifriction elements for providing a thrust load acting on one of said pair of outer raceways toward said medial plane, said axle further carrying a separable inner race having an inner raceway engaging said second complement of antifriction elements for providing an opposing thrust load acting on the other of said pair of outer raceways, said axle having a circumferential groove adjacent an end face of said separable inner race remote from said medial plane, a pair of hardened semicircular keeper ring parts disposed in said groove and engaging said end face of the separable inner race, said keeper ring parts having outer frustoconical surfaces, and being of a selected width to produce a desired end play or preload, and an annular retainer ring having an inner frustoconical surface engaging the frustoconical surfaces of said keeper ring parts to retain said keeper ring parts in said groove and a portion deformed into a second groove in said axle to permanently secure said annular retainer ring to said axle.

* * * * *

UNITED STATES PATENT AND TRADEMARK OFFICE
CERTIFICATE OF CORRECTION

PATENT NO. : 4,179,167
DATED : December 18, 1979
INVENTOR(S) : Loren E. Lura & Philip B. Zeigler It is certified that error appears in the above-identified patent and that said Letters Patent are hereby corrected as shown below:

Column 2, line 5, "suitably" should read -- suitable --.

Column 2, line 43, after "360." insert -- In the inner race bearing arrangement shown in the drawing, the keeper ring parts 54 are semicircular as shown in Figure 2 which minimizes the number of keeper ring parts. --.

Signed and Sealed this

Fifteenth Day of April 1980

[SEAL]

Attest:

SIDNEY A. DIAMOND

*Attesting Officer*     *Commissioner of Patents and Trademarks*

UNITED STATES PATENT AND TRADEMARK OFFICE
CERTIFICATE OF CORRECTION

PATENT NO. : 4,179,167
DATED : December 18, 1979
INVENTOR(S) : Loren E. Lura & Philip B. Zeigler It is certified that error appears in the above-identified patent and that said Letters Patent are hereby corrected as shown below:

Column 4, claim 1, line 2, "second" should read -- first --

Column 4, claim 2, line 26, "second" should read -- first --.

Signed and Sealed this

Seventeenth Day of June 1980

[SEAL]

Attest:

SIDNEY A. DIAMOND

Attesting Officer

Commissioner of Patents and Trademarks